(12) United States Patent  
Miyazaki et al.

(10) Patent No.: US 8,363,709 B2  
(45) Date of Patent: Jan. 29, 2013

(54) TRANSMISSION APPARATUS AND LINE QUALITY EVALUATING METHOD

(75) Inventors: Satoshi Miyazaki, Kawasaki (JP); Takashi Kuwabara, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 502 days.

(21) Appl. No.: 12/625,709

(22) Filed: Nov. 25, 2009

(65) Prior Publication Data

US 2010/0208786 A1 Aug. 19, 2010

(30) Foreign Application Priority Data

Feb. 17, 2009 (JP) ................................. 2009-034436

(51) Int. Cl.  
*H04B 17/00* (2006.01)

(52) U.S. Cl. ...................................................... 375/228

(58) Field of Classification Search .................. 375/224, 375/227–228; 370/536  
See application file for complete search history.

(56) References Cited

U.S. PATENT DOCUMENTS

| 7,324,562 | B1 | 1/2008 | Shankar et al. |
| 2006/0153231 | A1 | 7/2006 | Fricke |
| 2007/0036181 | A1* | 2/2007 | Nagasawa ..................... 370/536 |
| 2009/0154493 | A1* | 6/2009 | Hinderthuer .................. 370/466 |

FOREIGN PATENT DOCUMENTS

| EP | 0 849 972 | 6/1998 |
| JP | H06-029956 A | 2/1994 |
| JP | 2001-268038 A | 9/2001 |

OTHER PUBLICATIONS

"United Kingdom Search Report", mailed by Great Britain Patent Office and corresponding to GB0920847.1 on Feb. 12, 2010.

* cited by examiner

*Primary Examiner* — Khanh C Tran  
(74) *Attorney, Agent, or Firm* — Fujitsu Patent Center

(57) ABSTRACT

A transmission apparatus includes a test signal control unit that copies a test signal of a pseudo-random bit sequence and controls insertion of the same test signal in each member of a plurality of members of a concatenation signal, a concatenation signal transmitting unit that transmits each member of the concatenation signal with the test signal inserted therein by the test signal control unit to other apparatus via a plurality of transmission paths, a concatenation signal receiving unit that receives from the other apparatus each member of a plurality of members of a concatenation signal, and an individual-line-quality calculating unit that, using a test signal inserted in the members of the concatenation signal received by the concatenation signal receiving unit, individually evaluates each member of the concatenation signal received by the concatenation signal receiving unit and calculates a line quality of each transmission path.

3 Claims, 10 Drawing Sheets

FIG.5

<CASE 1>: OVERALL ERROR RATE OF N-CH VCAT

OVERALL ERROR RATE OF N-CH VCAT={(VC#1 ER)+(VC#2 ER)+...+(VC#N ER)}/N

- VC#1 ER: ERROR RATE OF VCAT-LINE VC CH-1
- VC#2 ER: ERROR RATE OF VCAT-LINE VC CH-2

⋮

- VC#N ER: ERROR RATE OF VCAT-LINE VC CH-N

<CASE 2>: ERROR RATE OF ROUTE-A VCAT-LINE (M-CH)

ERROR RATE OF ROUTE-A VCAT-LINE (M-CH)={(VC#1 ER)+(VC#2 ER)+...+(VC#M ER)}/M

- VC#1 ER: ERROR RATE OF ROUTE-A VCAT-LINE VC CH-1
- VC#2 ER: ERROR RATE OF ROUTE-A VCAT-LINE VC CH-2

⋮

- VC#M ER: ERROR RATE OF ROUTE-A VCAT-LINE VC CH-M

TRANSMISSION APPARATUS AND LINE QUALITY EVALUATING METHOD

CROSS-REFERENCE TO RELATED APPLICATION(S)

This application is based upon and claims the benefit of priority from Japanese Patent Application No. 2009-034436, filed on Feb. 17, 2009, the entire contents of which are incorporated herein by reference.

FIELD

The embodiments discussed herein are directed to a transmission apparatus and a line quality evaluating method for evaluating line quality of virtual concatenation (VCAT) signals to be transmitted.

BACKGROUND

Typically, in an Ethernet-over-OTN (EoO) network performing virtual concatenation (VCAT) transmission (Ethernet is a registered trademark and OTN stands for optical transport network), line quality evaluation information regarding a transmission path is measured by transmitting a test signal such as a pseudo-random bit sequence (PRBS) signal, as stipulated in the ITU-T G.709 (OTN) standard. Moreover, although not stipulated in the current ITU-T standard, there is a demand that the technology of measuring line quality evaluation information using a PRBS signal as a test signal be applied to an Ethernet-over-SDH/SONET (EoS) network or an Ethernet-over-PDH (EoP) network in an identical manner to that of an EoO network (SDH stands for synchronous digital hierarchy, SONET stands for synchronous optical networking, and PDH stands for plesiochronous digital hierarchy).

To perform full transmission of a 1 Gigabit Ethernet (GbE) signal in an EoS network as illustrated in FIG. 7, seven VC4 signals (VCAT members) are virtually concatenated as a VC4-7V signal that is then transmitted over an SDH network. That makes it possible to effectively use the transmission band. In comparison, when VCAT transmission is not performed, the transmission is performed with a VC4-16C signal thereby resulting in a waste of 50% or more of the transmission band.

Meanwhile, it is not necessary that all seven VCAT members (VC4 signals) are transmitted over the same transmission path. That is, depending on the usage condition of the transmission line, the seven VC4 signals are sometimes divided into, for example, a group of four VC4 signals and a group of three VC4 signals and each group of VC4 signals is transmitted over a separate transmission path as illustrated in FIG. 7.

For such a case, there is a demand that an EoS apparatus (VCAT transmission apparatus) in a VCAT transmission system be equipped with a line quality evaluation feature using a PRBS signal (PRBS transmission feature, PRBS monitoring feature) to evaluate the line quality.

In practice, line quality evaluation using a PRBS signal can be performed with either an EoS processing unit illustrated in FIG. 8 that enables line quality evaluation of the entire VCAT signal (VC4-7V signal in the abovementioned example) or an EoS processing unit illustrated in FIG. 9 that enables elementary line quality evaluation of each VC path on an individual basis without giving consideration to the VCAT signal.

In the EoS processing unit illustrated in FIG. 8, line quality evaluation of the entire VCAT signal (VC4-7V signal in the abovementioned example) is performed by receiving a PRBS signal that is inserted in serial with respect to the entire VCAT signal and calculating an overall error rate for the entire VCAT signal.

In comparison, to perform elementary line quality evaluation of each VC path on an individual basis without giving consideration to the VCAT signal in the EoS processing unit illustrated in FIG. 9, a selector is disposed corresponding to each of seven VC signal processing units #1 to #7. Then, a PRBS generation/monitoring unit is selected for each VCAT member (7 times for each VC4 signal and 21 times for each VC3 signal) to individually evaluate the line quality of each VCAT member. Alternatively, a plurality of PRBS generation/monitoring units (7 for a VC4 signal and 21 for a VC3 signal) can be disposed for individual evaluation of line quality (see Japanese Laid-open Patent Publication No. 2001-268038 for further description of the conventional technique).

Meanwhile, in the technology of line quality evaluation of the entire VCAT signal, the line quality of individual VCAT members cannot be verified in consideration of division of the transmission path in VCAT transmission. That makes it difficult to independently evaluate the line quality of each transmission path.

In a conventional EoS apparatus, a VC-nC signal is demultiplexed into a VC signal by performing byte interleaving and is transmitted in parallel as a VC-nV signal to individual VCAT members. Thus, in a network in which, as illustrated in FIG. 7, transmission is performed over two transmission paths by dividing the VCAT signal into a group of four VC4 signals and a group of three VC4 signals, the signal sequence of the PRBS signal gets disturbed (see FIG. 10).

For that reason, when the transmission path is divided, it is not possible to obtain the error rate of each divided transmission path on an individual basis. As a result, the line quality of each VCAT member cannot be verified individually at the same time. That makes it difficult to independently evaluate the line quality of each transmission path.

On the other hand, in the technology of simple line quality evaluation of each VC path on an individual basis without giving consideration to the VCAT signal, it is necessary to dispose a selector corresponding to each of the VC signal processing units #1 to #7 or dispose a plurality of PRBS generation/monitoring units. However, that is not an efficient way of performing line quality evaluation.

SUMMARY

According to an aspect of an embodiment of the invention, a transmission apparatus includes a test signal control unit, a concatenation signal transmitting unit, a concatenation signal receiving unit, and an individual-line-quality calculating unit. The test signal control unit copies a test signal of a pseudo-random bit sequence and controls insertion of the same test signal in each member of a plurality of members of a concatenation signal. The concatenation signal transmitting unit transmits each member of the concatenation signal with the test signal inserted therein by the test signal control unit to other apparatus via a plurality of transmission paths. The concatenation signal receiving unit receives from the other apparatus each member of a plurality of members of a concatenation signal. The individual-line-quality calculating unit, using a test signal inserted in the members of the concatenation signal received by the concatenation signal receiving unit, individually evaluates each member of the concatenation signal received by the concatenation signal receiving unit and calculates a line quality of each transmission path.

According to another aspect of an embodiment of the invention, a method for evaluating a line quality includes: copying a test signal of a pseudo-random bit sequence and inserting the same test signal in each member of a plurality of members of a concatenation signal; transmitting each member of the concatenation signal inserted with the test signal in the inserting to another apparatus via a plurality of transmission paths; receiving each member of a plurality of members of a concatenation signal from the other apparatus; and individually evaluating the members of the concatenation signal received at the receiving using the test signal inserted in the members of the concatenation signal received at the receiving and calculating a line quality of each transmission path.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 5 is a schematic diagram of a formula for calculating a VCAT PRBS error rate;

DESCRIPTION OF EMBODIMENT(S)

Preferred embodiments of the present invention will be explained with reference to accompanying drawings.

[a] First Embodiment

Given below is the description regarding a configuration of a VCAT transmission apparatus according to a first embodiment of the present invention, a sequence of operations performed by the VCAT transmission apparatus, and the effect of the first embodiment. The following description relates to line quality verification of a VCAT signal transmitted over a SONET/SDH network. Similarly, the description is also applicable to line quality verification of a VCAT signal transmitted over a PDH network or an OTN.

Configuration of the VCAT transmission apparatus

Figure 1:
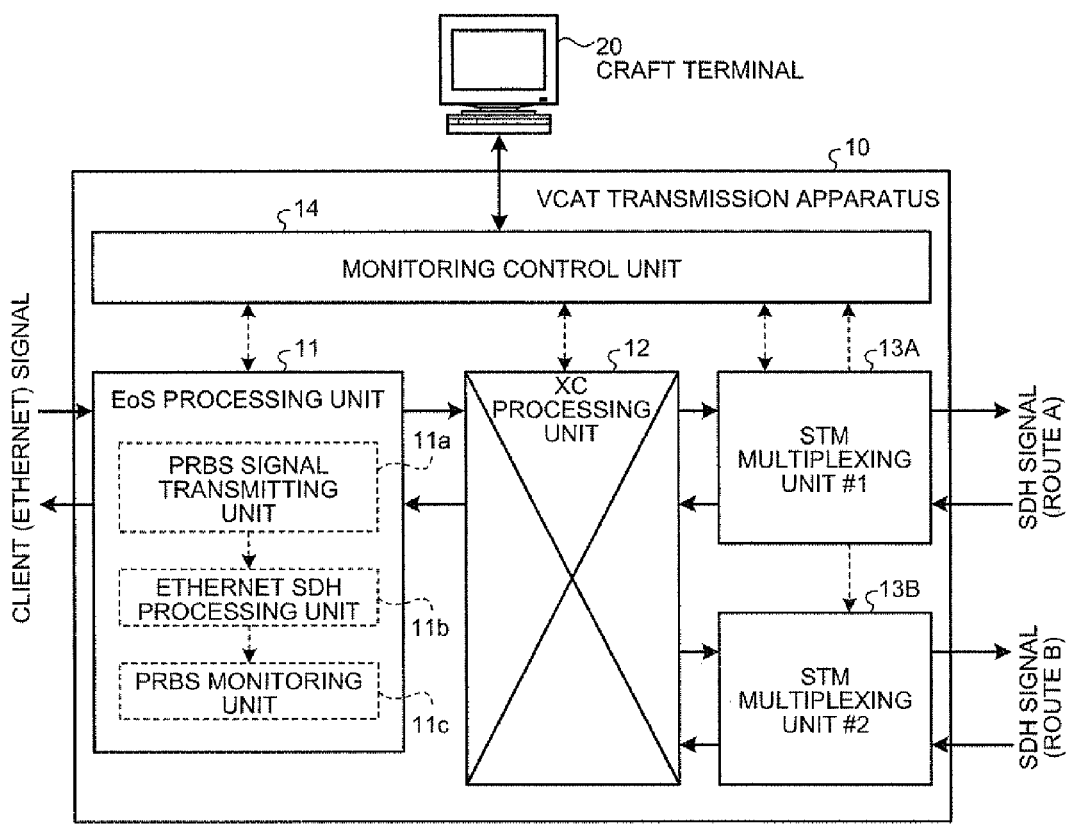
FIG. 1 is a block diagram of an overall configuration of a VCAT transmission apparatus according to a first embodiment of the present invention.
Figure 2:
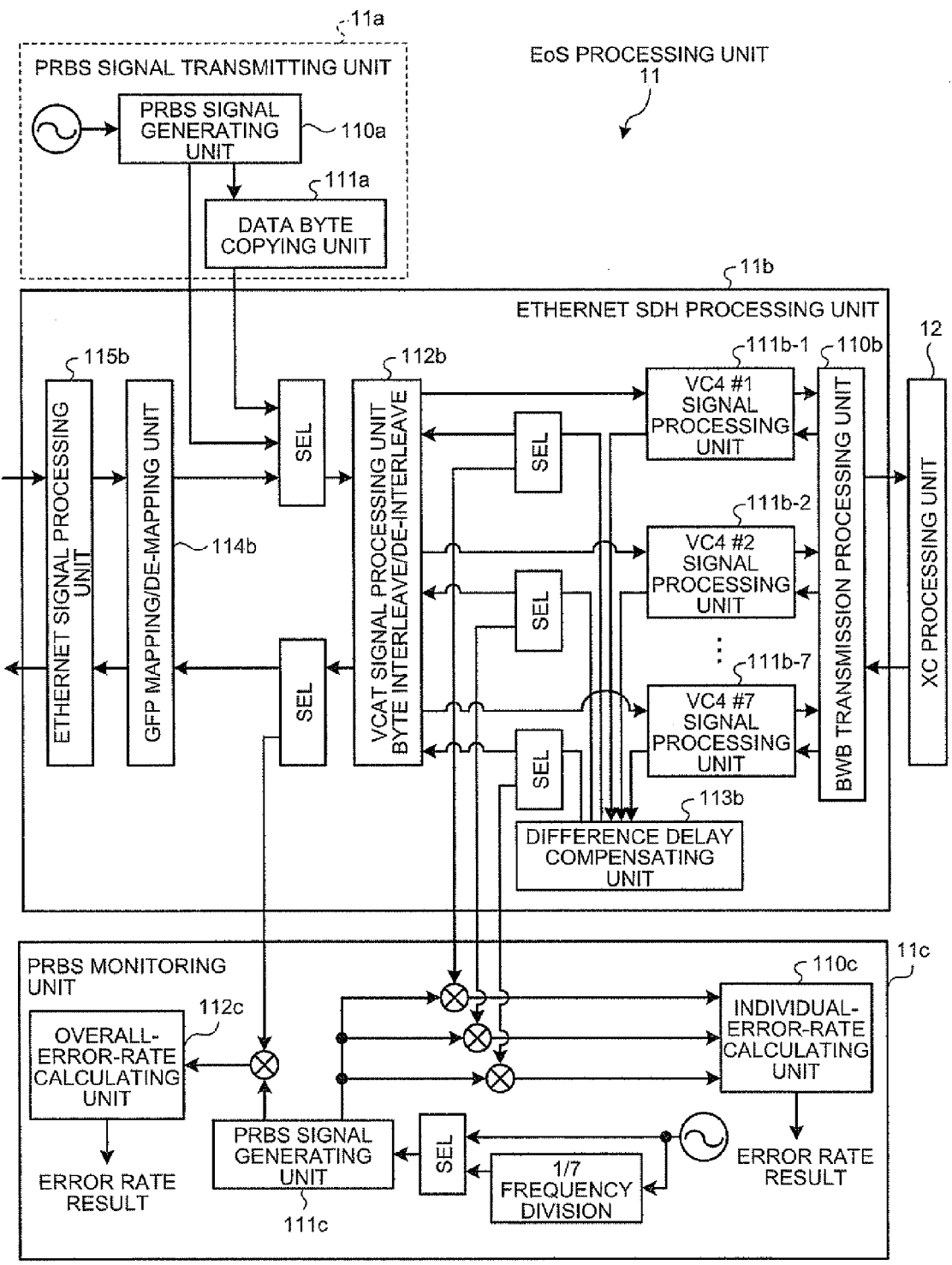
FIG. 2 is a block diagram of a detailed configuration of an EoS processing unit disposed in the VCAT transmission apparatus illustrated in FIG. 1.
Figure 3:
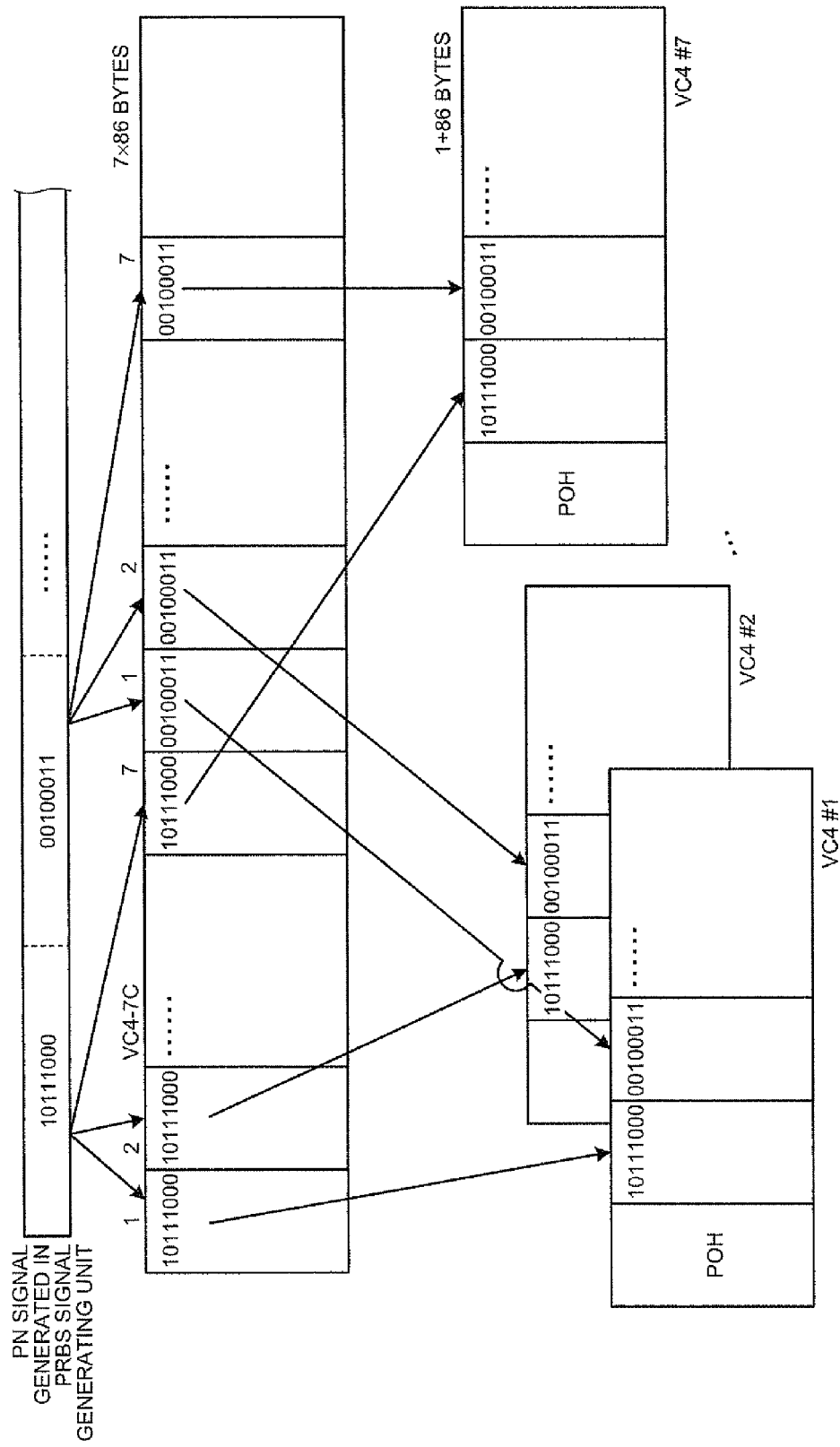
FIG. 3 is a schematic diagram of a signal sequence of a PRBS signal that is copied and mapped in VCAT members.
Figure 4:
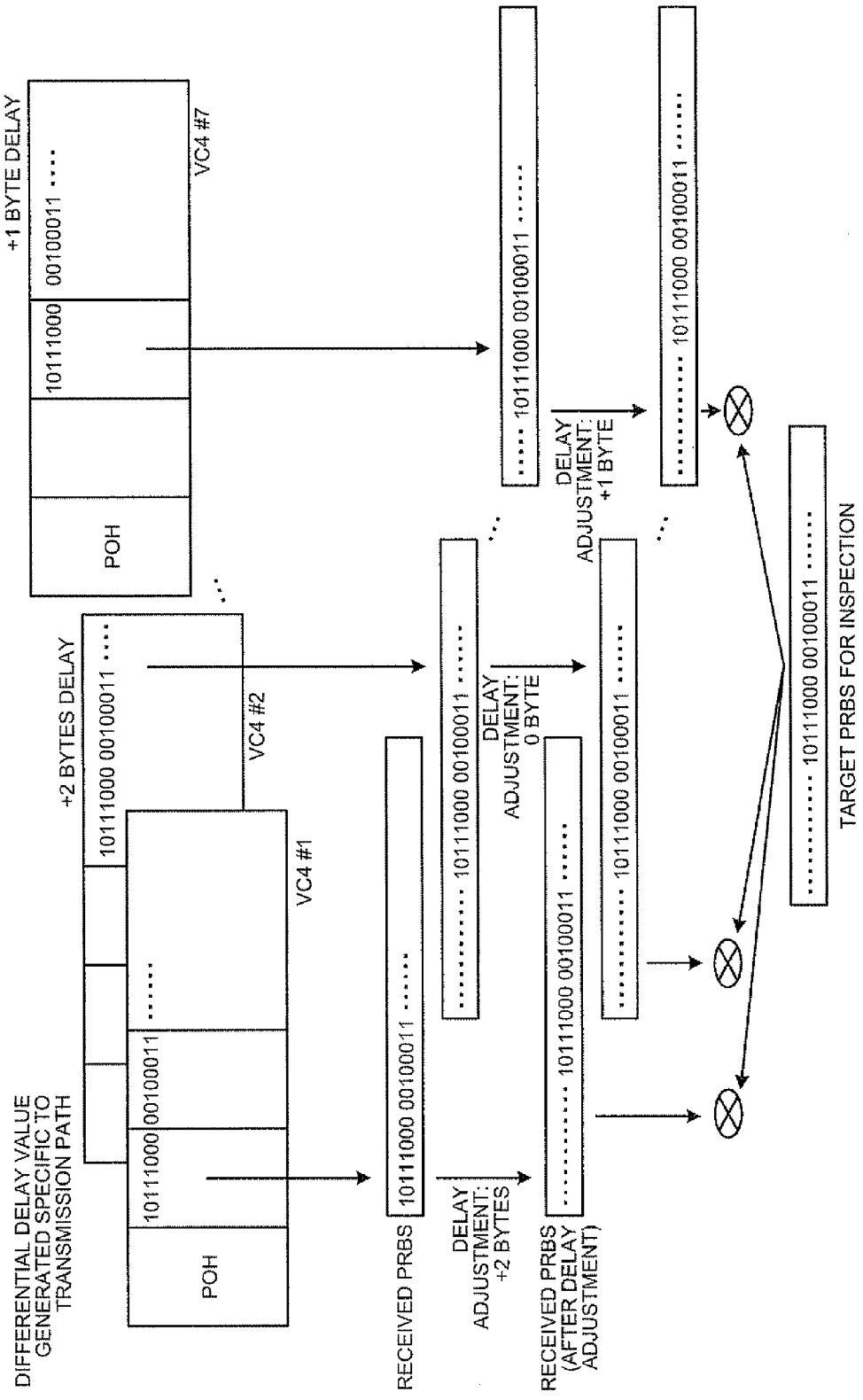
FIG. 4 is a schematic diagram for explaining how a comparison with a PRBS signal is performed by performing delay adjustment at the time of receiving the PRBS signal.

FIG. 1 is a block diagram of a configuration of a VCAT transmission apparatus 10 according to the first embodiment. FIG. 2 is a block diagram of a detailed configuration of an EoS processing unit disposed in the VCAT transmission apparatus 10. FIG. 3 is schematic diagram of a signal sequence of a PRBS signal that is copied and mapped in VCAT members. FIG. 4 is a schematic diagram for explaining how a comparison with a PRBS signal is performed by performing delay adjustment at the time of receiving the PRBS signal. FIG. 5 is a schematic diagram of a formula for calculating a VCAT PRBS error rate.

As illustrated in FIG. 1, the VCAT transmission apparatus 10 includes an EoS processing unit 11, a cross-connect (XC) processing unit 12, two synchronous transport module (STM) multiplexing units 13A and 13B, and a monitoring control unit 14. The VCAT transmission apparatus 10 is connected to a craft terminal 20 that issues instructions regarding initial settings and monitoring function settings for the VCAT transmission apparatus 10.

The EoS processing unit 11 includes a PRBS signal transmitting unit 11a, an Ethernet SDH processing unit 11b, and a PRBS monitoring unit 11c. The detailed configuration of the EoS processing unit 11 is described later with reference to FIG. 2. The PRBS signal transmitting unit 11a transmits a PRBS signal as a test signal for line quality verification. The PRBS monitoring unit 11c evaluates the line quality of a VCAT signal to be transmitted.

The Ethernet SDH processing unit 11b transfers an Ethernet frame mapped into an SDH frame to the XC processing unit 12.

The XC processing unit 12 performs cross-connect processing on the signal output by the EoS processing unit 11, the STM multiplexing unit 13A, or the STM multiplexing unit 13B. That is, the XC processing unit 12 performs transmission line settings to make sure that the signal output by the EoS processing unit 11, the STM multiplexing unit 13A, or the STM multiplexing unit 13B is correctly transmitted to the intended destination and outputs the transmission line settings to the EoS processing unit 11, the STM multiplexing unit 13A, or the STM multiplexing unit 13B.

On the one hand, each of the STM multiplexing units 13A and 13B performs transmission path multiplexing and transmits an SDH signal to an external apparatus via a route A and a route B, respectively.

On the other hand, upon receiving an SDH signal via the routes A and B, respectively, each of the STM multiplexing units 13A and 13B divides the respective SDH signal into a plurality of signals and transfers the divided signals to the XC processing unit 12, which in turn transfers the signals to the EoS processing unit 11. The EoS processing unit 11 receives an SDH frame, restores the Ethernet frame mapped in the SDH frame, and transmits a packet to a client apparatus (not illustrated).

The monitoring control unit 14 receives from the craft terminal 20 an instruction regarding initial settings or an instruction on starting VCAT line quality evaluation and accordingly performs settings in the EoS processing unit 11. In addition, the monitoring control unit 14 displays line quality information such as the individual error rate of each VCAT members or the overall error rate of the entire VCAT signal (if necessary, error rate of each divided transmission path) on the craft terminal 20.

Given below is the detailed configuration of the EoS processing unit 11 with reference to FIG. 2. As illustrated in FIG. 2, the PRBS signal transmitting unit 11a copies a PRBS signal as a test signal and makes sure that the same PRBS signal is inserted in each member of the VCAT signal. The PRBS signal transmitting unit 11a mainly includes a PRBS signal generating unit 110a and a data byte copying unit 111a.

The PRBS signal generating unit 110a generates a PRBS signal as the test signal (e.g., a PN23 signal) and outputs it to the data byte copying unit 111a or the Ethernet SDH processing unit 11b.

The data byte copying unit 111a copies the PRBS signal and makes sure that the PRBS signal with the same data sequence is inserted in all VCAT members.

More particularly, as illustrated in FIG. 3, a serial PRBS signal (e.g., a PN23 signal) that is transmitted with respect to the entire VCAT signal is inserted in each of seven de-multiplexed VC4 signals. As a result, the PN23 signal having one-seventh of the transmission speed gets mapped in each VC4 signal and transmitted in parallel. Thus, the line quality can be evaluated based on a significant test signal (PRBS signal) for each VC4 signal.

Moreover, by copying a serial PRBS signal and mapping the copied data in each VC4 signal (VCAT member), the same test pattern is transmitted in each VC4 signal. Thus, only a single PRBS generation/monitoring unit is sufficient for the monitoring purpose.

The Ethernet SDH processing unit 11b, on the one hand, transmits each member of the VCAT signal with the PRBS signal inserted therein to another VCAT transmission apparatus via a plurality of transmission paths and, on the other hand, receives members of a VCAT signal from another VCAT transmission apparatus. The Ethernet SDH processing unit 11b includes a back wiring board (BWB) transmission processing unit 110b, VC signal processing units 111b-1 to 111b-7, a VCAT signal processing unit 112b, a difference delay compensating unit 113b, a GFP mapping/de-mapping unit 114b, and an Ethernet signal processing unit 115b.

The BWB transmission processing unit 110b transmits VC4 signals, from a VC4 #1 signal to a VC4 #7 signal with the same PN23 signal (PRBS signal) inserted therein to another VCAT transmission apparatus.

The VC signal processing units 111b-1 to 111b-7 corresponding respectively to the VC4 #1 to VC4 #7 signals (i.e., in FIG. 2, VC4 #1 signal processing unit 111b-1 to VC4 #7 signal processing unit 111b-7) perform path overhead (POH) processing. More particularly, each of the VC signal processing units 111b-1 to 111b-7 receives a corresponding VC4 signal from the VCAT signal processing unit 112b and performs POH settings in that VC4 signal.

The VCAT signal processing unit 112b maps the PRBS signal, which has been copied by the data byte copying unit 111a, in each VC4 signal and sends it to one of the VC signal processing units 111b-1 to 111b-7 corresponding to each of the VC4 #1 to VC4 #7 signals. As a result, the test pattern in each VC4 signal is identical. More particularly, the VCAT signal processing unit 112b inserts the serial PRBS signal (e.g., a PN23 signal) transmitted with respect to the entire VCAT signal and including the same VC4#1 to VC4#7, in each VC4 as a test signal. Meanwhile, the enabling/disabling of a PRBS-based line quality evaluation function can be controlled by selecting a normal Ethernet (GFP) frame (GFP stands for generic framing procedure), a serial PRBS signal, or a byte COPY PRBS signal at a selector ("SEL" in FIG. 2) disposed before each of the VC signal processing units 111b-1 to 111b-7. (The control setting is done by an operator using the craft terminal 20).

The difference delay compensating unit 113b absorbs a delay corresponding to the path difference for each VCAT member such that the phase difference of the PRBS signal mapped in each VCAT member is uniform. More particularly, as illustrated in FIG. 4, the difference delay compensating unit 113b matches, at the time of signal reception, the PRBS monitoring timing for each received signal using delay information (differential delay value) that is obtained inside the apparatus at the time of VCAT signal restoration. As a result, the differential delay caused by using a separate transmission path for transmitting each VCAT member is absorbed.

Subsequently, an individual-error-rate calculating unit 110c (described later) simultaneously inspects all VCAT members (seven in the abovementioned example). Since the test pattern transmitted in all VC4 signals (VCAT members) is identical, only a single PRBS generation/monitoring unit is sufficient for the monitoring purpose.

The GFP mapping/de-mapping unit 114b, on the one hand, maps all obtained information in an Ethernet (GFP) frame format and, on the other hand, extracts data from a received Ethernet (GFP) frame.

The Ethernet signal processing unit 115b transmits an Ethernet packet that has been mapped in a GFP frame format by the GFP mapping/de-mapping unit 114b to the client apparatus.

The PRBS monitoring unit 11c individually evaluates each VCAT member using the test signal inserted therein and calculates the line quality of each transmission path. The PRBS monitoring unit 11c includes the individual-error-rate calculating unit 110c, a PRBS signal generating unit 111c, and an overall-error-rate calculating unit 112c.

The individual-error-rate calculating unit 110c individually evaluates each VCAT member and calculates the corresponding error rate. More particularly, the individual-error-rate calculating unit 110c simultaneously inspects the VCAT members (seven in the abovementioned example) with respect to which the difference delay compensating unit 113b has matched the PRBS monitoring timing for each received signal.

In addition, the individual-error-rate calculating unit 110c obtains VCAT line quality information by calculating the error rate of the entire VCAT signal (if necessary, error rate of each divided transmission path) from the individual error rate of each VCAT member (see formula given in FIG. 5).

The PRBS signal generating unit 111c generates a PRBS signal as the test signal (e.g., a PN23 signal) and outputs it to the individual-error-rate calculating unit 110c and the overall-error-rate calculating unit 112c for the monitoring purpose. Herein, since the test pattern transmitted in all VC4 signals is identical, only a single PRBS signal generating unit 111c is sufficient.

The overall-error-rate calculating unit 112c calculates the overall error rate of the entire VCAT signal. More particularly, the overall-error-rate calculating unit 112c receives, from a selector subsequent to the VCAT signal processing unit 112b, a PRBS signal inserted in serial with respect to the entire VCAT signal and calculates the overall error rate of the entire VCAT signal.

Operations Performed by the VCAT Transmission Apparatus

Figure 6A:
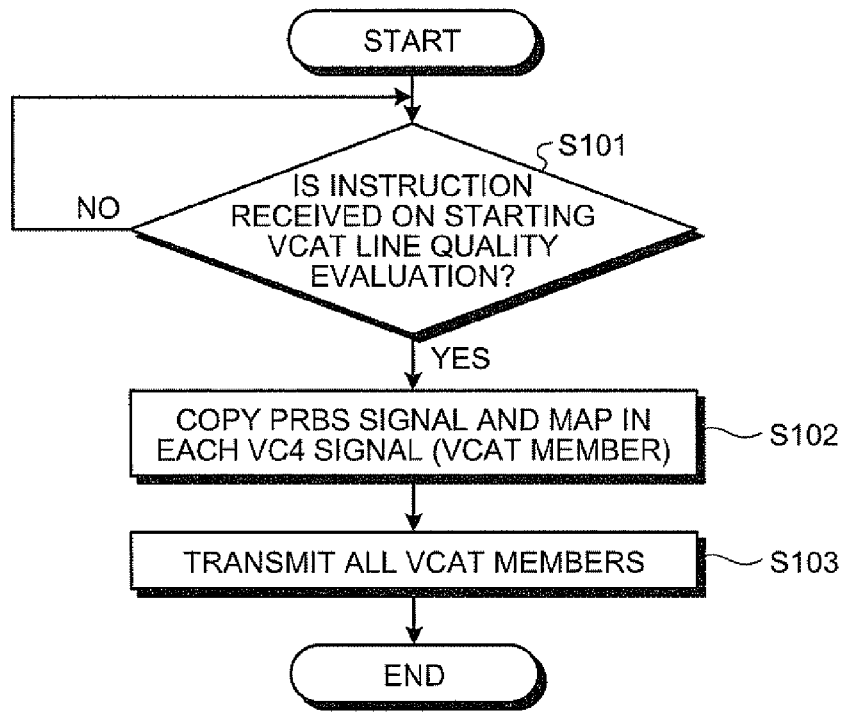
FIG. 6A is a flowchart for explaining transmission of VCAT members in the VCAT transmission apparatus illustrated in FIG. 1.
Figure 6B:
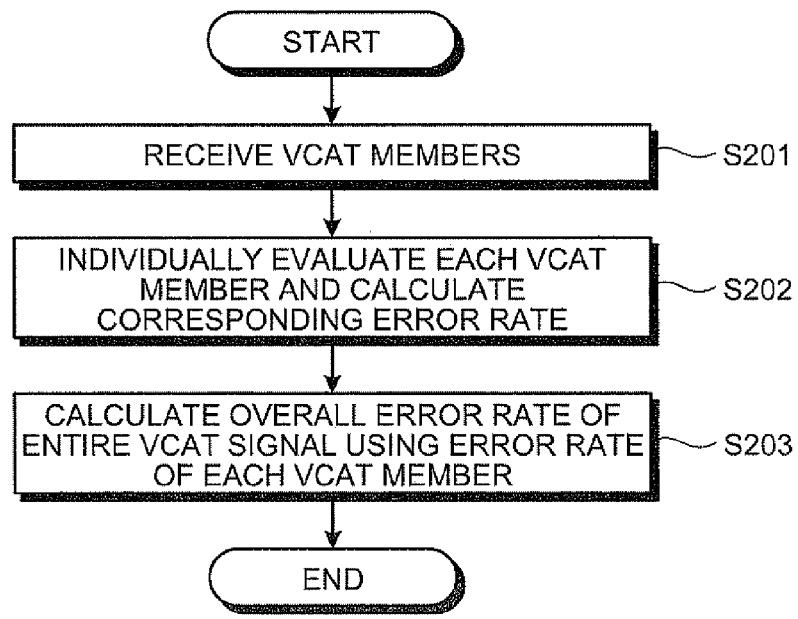
FIG. 6B is a flowchart for explaining reception and evaluation of VCAT members in the VCAT transmission apparatus illustrated in FIG. 1.
Figure 7:
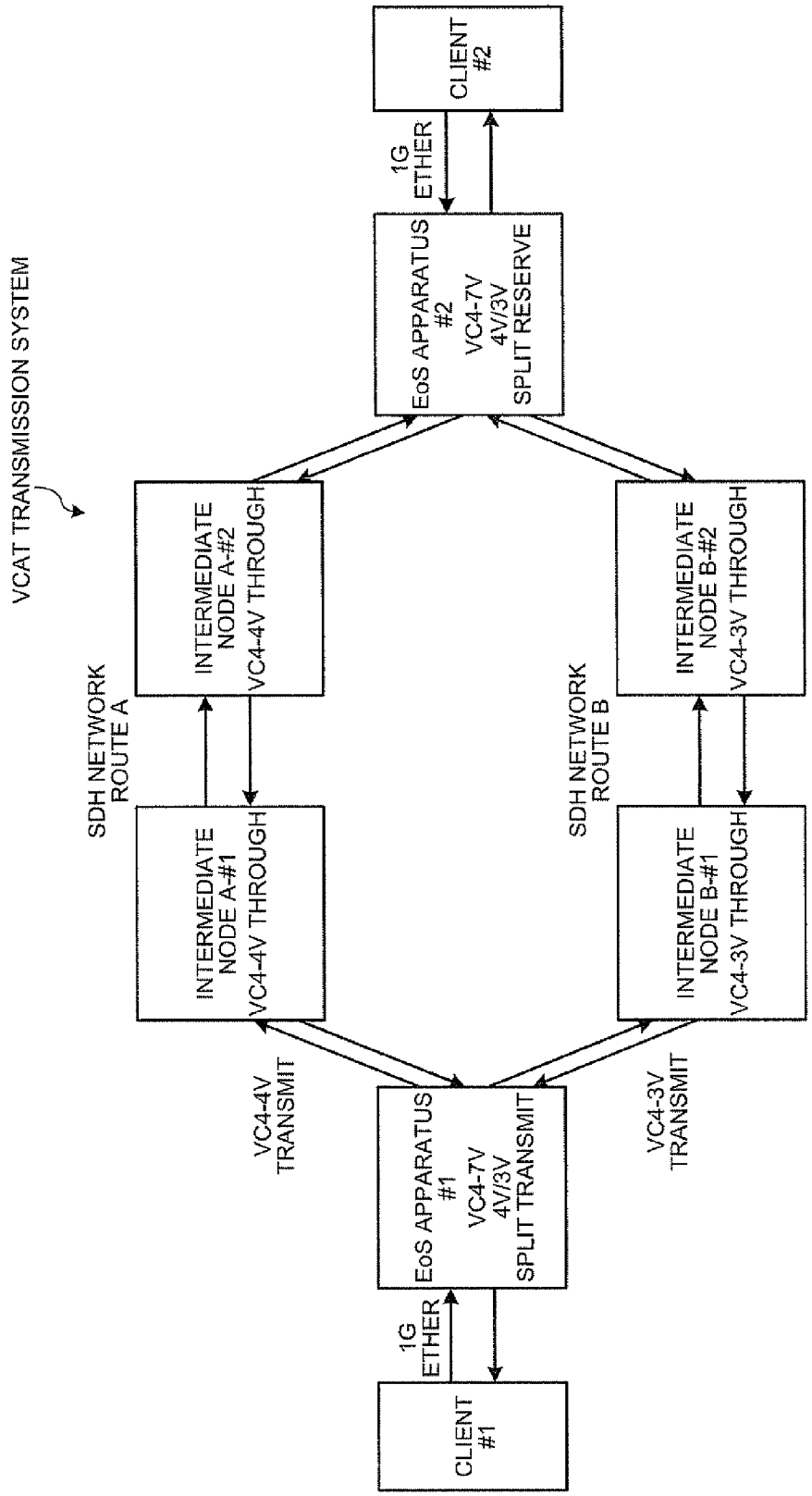
FIG. 7 is a schematic diagram for explaining a conventional technology.
Figure 8:
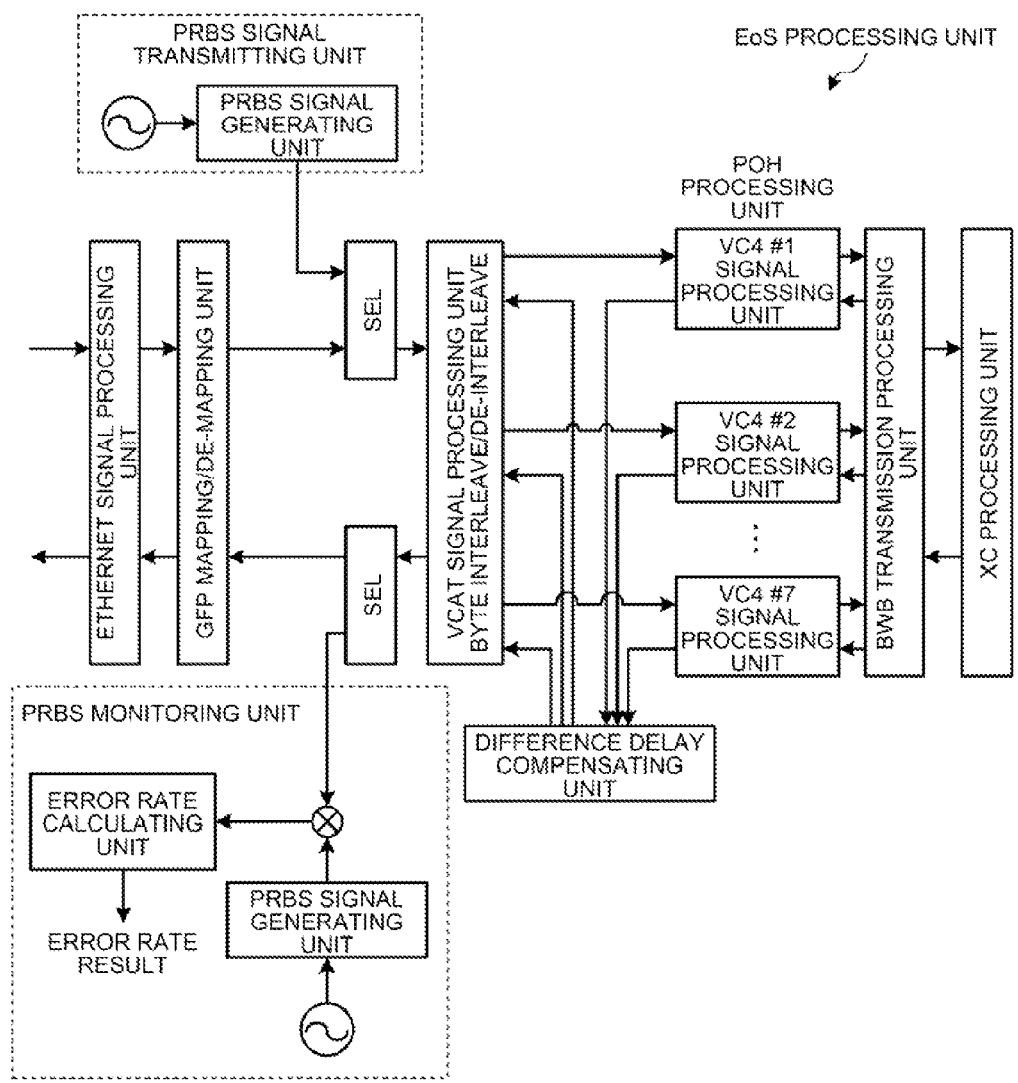
FIG. 8 is a schematic diagram for explaining a conventional technology.
Figure 9:
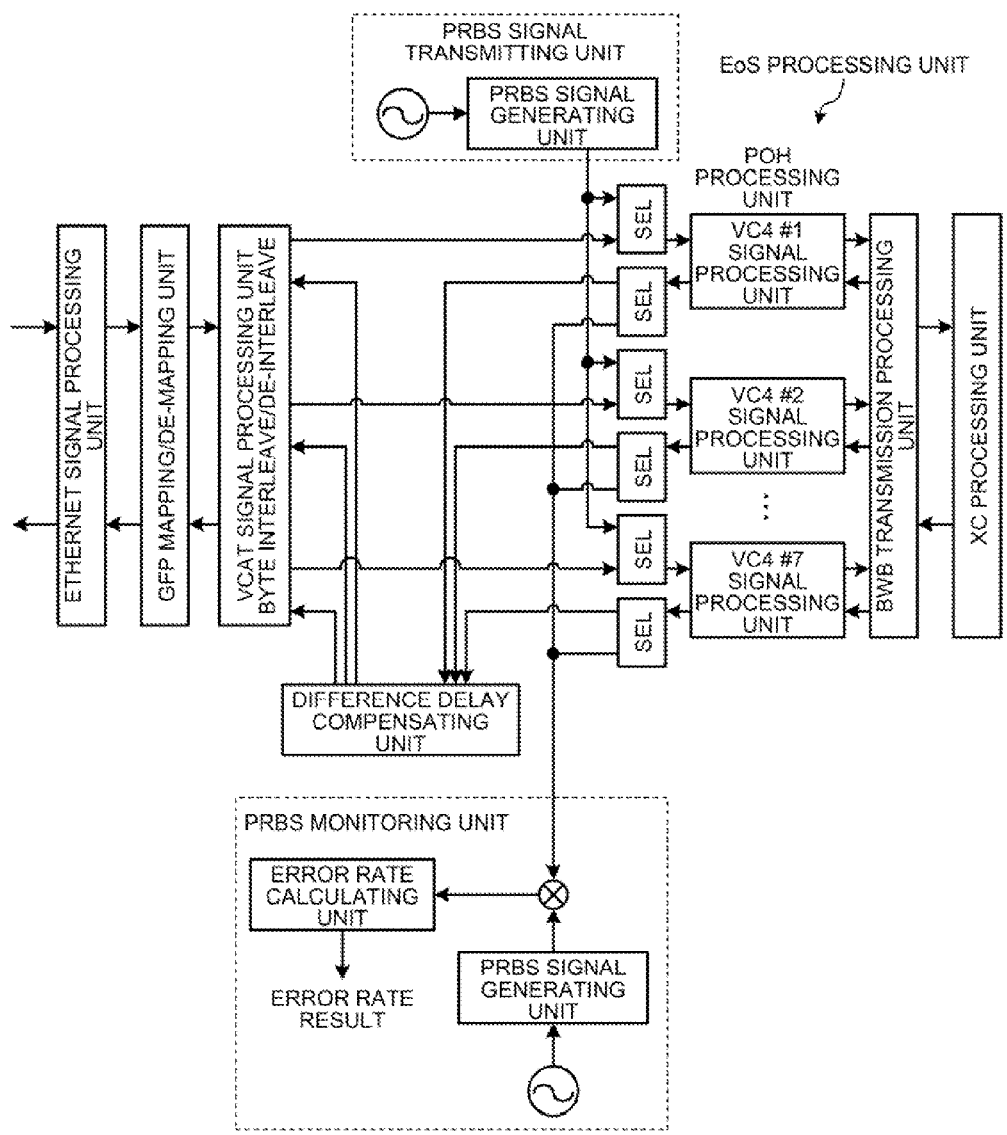
FIG. 9 is a schematic diagram for explaining a conventional technology.
Figure 10:
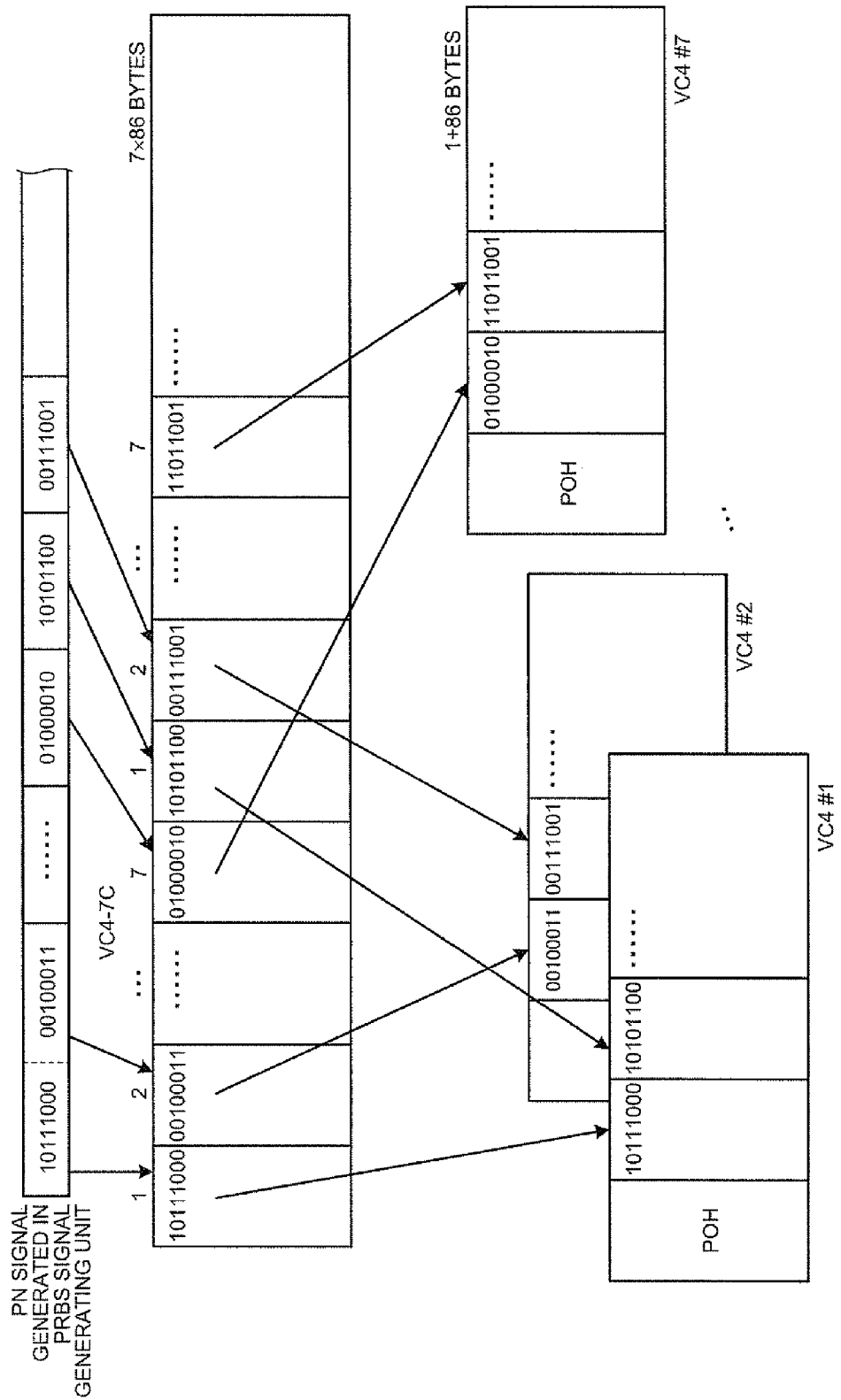
FIG. 10 is a schematic diagram for explaining a conventional technology.

FIGS. 6A and 6B are flowcharts for explaining operations performed in the VCAT transmission apparatus 10 according to the first embodiment. FIG. 6A is used to explain transmission of VCAT members in a VCAT transmission apparatus 10A identical to the VCAT transmission apparatus 10, while FIG. 6B is used to explain reception and evaluation of VCAT members in a VCAT transmission apparatus 10B also identical to the VCAT transmission apparatus 10.

As illustrated in FIG. 6A, upon receiving from the craft terminal 20 an instruction on starting VCAT line quality evaluation (Yes at Step S101), the VCAT transmission apparatus 10A copies a PRBS signal and maps the same PRBS signal in each VC4 signal (VCAT member) (Step S102).

Then, the VCAT transmission apparatus 10A sends all VCAT members to another VCAT transmission apparatus via the routes A and B of the SDH network (Step S103).

As illustrated in FIG. 6B, the VCAT transmission apparatus 10B receives VCAT members via the routes A and B (Step S201). Herein, the VCAT transmission apparatus 10B absorbs the delay corresponding to the path difference for each VCAT member such that the phase difference of the PRBS signal mapped in each VCAT member is uniform.

Subsequently, the VCAT transmission apparatus 10B individually evaluates each VCAT member and calculates the corresponding error rate (Step S202). Then, the VCAT transmission apparatus 10B calculates the error rate of the entire VCAT signal (or error rate of each divided transmission path) using the individual error rate of each VCAT member (Step S203).

Effect of the First Embodiment

As described above, the VCAT transmission apparatus 10 copies a PRBS signal as a test signal and makes sure that the same PRBS signal is inserted in each VCAT member of a VCAT signal. Then, the VCAT transmission apparatus 10 transmits each VCAT member of the VCAT signal with the PRBS signal inserted therein to another VCAT transmission apparatus via a plurality of transmission paths. On the other hand, upon receiving VCAT members of a VCAT signal from another VCAT transmission apparatus, the VCAT transmission apparatus 10 individually evaluates each received VCAT member using the test signal inserted therein and calculates the line quality of each transmission path. Thus, during VCAT transmission, it is possible to calculate the error rate of each divided transmission path in a network as well as calculate the individual error rate of each VCAT member with only a single PRBS circuit. That enables performing efficient evaluation of the line quality of each transmission path.

Moreover, the VCAT transmission apparatus 10 inserts a PRBS signal as a test signal with respect to an entire VCAT signal and calculates the line quality of the entire VCAT signal using the inserted test signal. Thus, in the same manner to the conventional technology, the VCAT transmission apparatus 10 is capable of calculating the error rate of the entire VCAT signal.

Furthermore, since the VCAT transmission apparatus 10 calculates the line quality of the entire VCAT signal using the line quality of each transmission path, the error rate of the entire VCAT signal is calculated with due consideration to a network having divided transmission paths.

[b] Second Embodiment

Besides the first embodiment described above, it is also possible to implement various other embodiments. Given below is the description of a second embodiment of the present invention.
(1) System Configuration The constituent elements of each apparatus illustrated in the drawings are merely conceptual, and need not be physically configured as illustrated. The constituent elements, as a whole or in part, can be separated or integrated either functionally or physically based on various types of loads or use conditions. For example, the PRBS signal transmitting unit 11a and the PRBS monitoring unit 11c can be combined into a single constituent element. Moreover, the process functions performed by the apparatus may be entirely or partially realized by a CPU or computer programs that are analyzed and executed by a CPU, or realized as hardware by wired logic.

Furthermore, of the processes described in the embodiments, all or part of the processes explained as being performed automatically can be performed manually. Similarly, all or part of the processes explained as being performed manually can be performed automatically by a known method. The processing procedures, the control procedures, specific names, various data, and information including parameters described in the embodiments or illustrated in the drawings can be changed as required unless otherwise specified.
(2) Program The line quality evaluating method described in the present embodiment can be implemented by executing a program written in advance in a computer such as a personal computer (PC) or a workstation. The program can be distributed over a network such as the Internet. Alternatively, the program can be stored in a computer-readable recording medium such as a hard disk drive, a flexible disk (FD), a compact disk read only memory (CD-ROM), a magneto-optical (MO) disk, and a digital versatile disk (DVD) such that a computer can read the program from the recording medium and execute it.

In this way, according to an embodiment of the present invention, it is possible to perform efficient evaluation of line quality of each transmission path.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A transmission apparatus comprising:
a test signal control unit that copies a test signal of a pseudo-random bit sequence and controls insertion of the same test signal in each member of a plurality of members of a concatenation signal, the test signal control unit inserting the test signal with respect to entirety of the concatenation signal;
a concatenation signal transmitting unit that transmits each member of the concatenation signal with the test signal inserted therein by the test signal control unit to other apparatus via a plurality of transmission paths;
a concatenation signal receiving unit that receives from the other apparatus each member of a plurality of members of a concatenation signal;
an individual-line-quality calculating unit that, using a test signal inserted in the members of the concatenation signal received by the concatenation signal receiving unit, individually evaluates each member of the concatenation signal received by the concatenation signal receiving unit and calculates a line quality of each transmission path; and
an overall-line-quality calculating unit that calculates a line quality of entirety of the concatenation signal received by the concatenation signal receiving unit using the test signal inserted with respect to the entirety of the concatenation signal.

2. The transmission apparatus according to claim 1, wherein the individual-line-quality calculating unit further calculates a line quality of entirety of the concatenation signal using calculated line quality of each transmission path.

3. A method for evaluating a line quality comprising:

copying a test signal of a pseudo-random bit sequence and inserting the same test signal in each member of a plurality of members of a concatenation signal;

inserting the test signal with respect to entirety of the concatenation signal;

transmitting each member of the concatenation signal inserted with the test signal in the inserting to another apparatus via a plurality of transmission paths;

receiving each member of a plurality of members of a concatenation signal from the other apparatus;

individually evaluating the members of the concatenation signal received at the receiving using the test signal inserted in the members of the concatenation signal received at the receiving and calculating a line quality of each transmission path; and calculating a line quality of entirety of the concatenation signal received by the receiving using the test signal inserted with respect to the entirety of the concatenation signal.

* * * * *